United States Patent Office 3,305,756
Patented Feb. 21, 1967

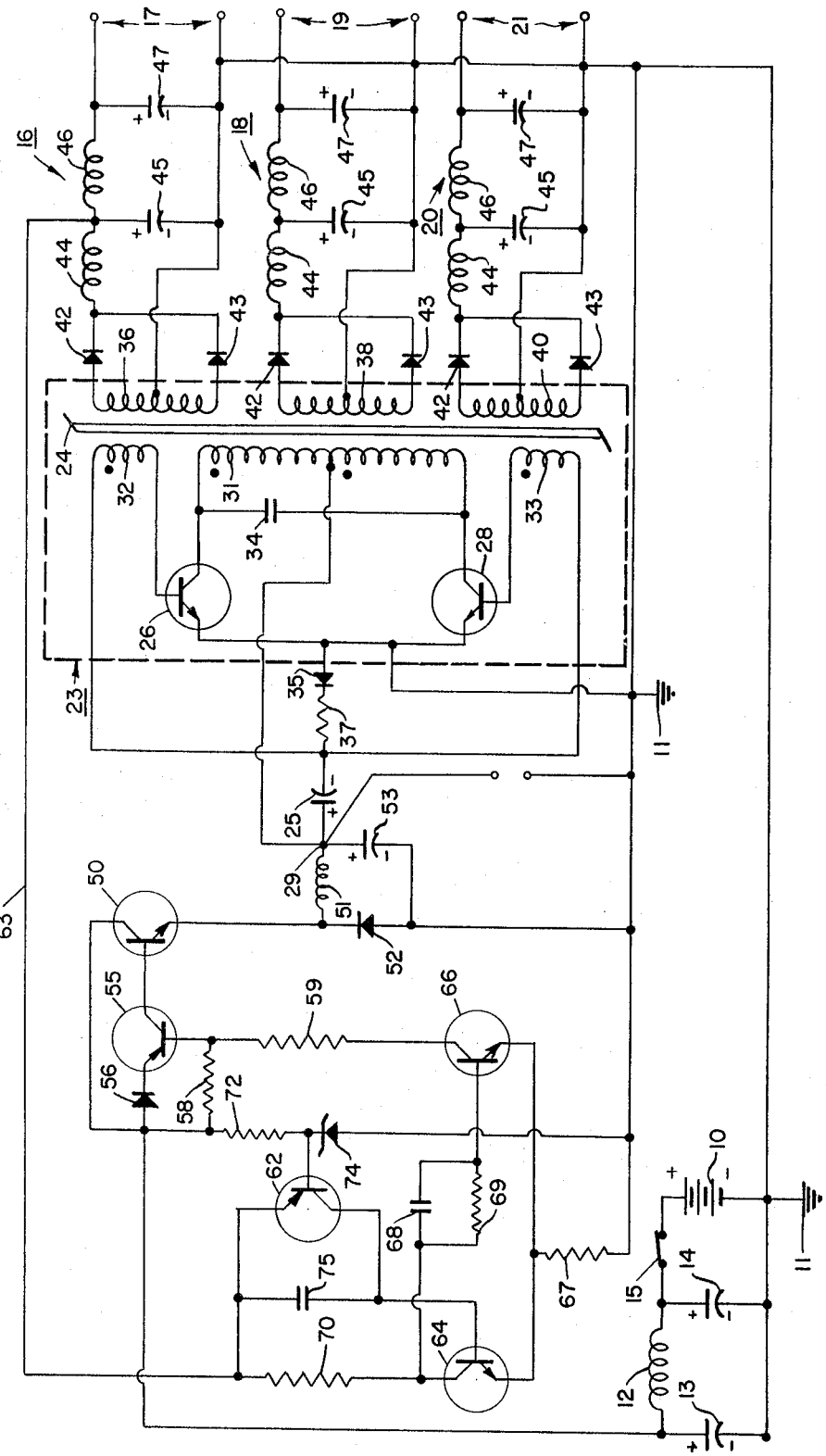

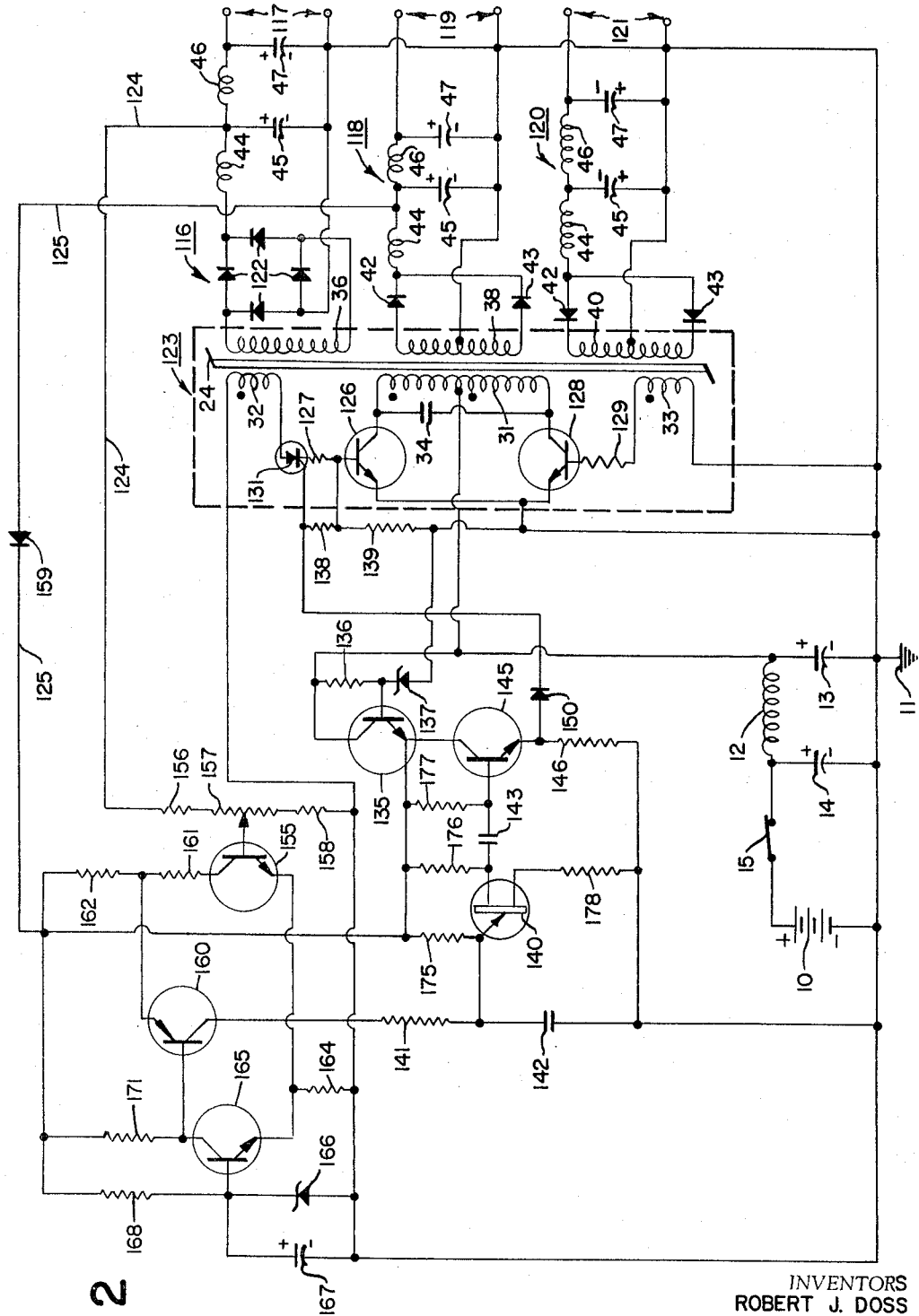

3,305,756
COMBINED GATED PULSE SOURCE-TRANSVERTER-RECTIFIER POWER SUPPLY WITH SAMPLING CONNECTION FOR REGULATION
Robert J. Doss, Cincinnati, and Joseph E. Naylor, Cleveland, Ohio, assignors to Avco Corporation, Cincinnati, Ohio, a corporation of Delaware
Filed Feb. 3, 1964, Ser. No. 342,087
4 Claims. (Cl. 321—2)

This invention relates to power supplies and more particularly to direct current power supplies for producing stabilized output voltages.

Many situations exist in which a piece of operating electronic equipment requires one or more stabilized direct current (D.C.) power supply voltages for optimum performance. In some cases this stabilized voltage is not available although a source of varying D.C. voltage is. An example of this is in communications equipment designed for use in vehicular installations, or in any other type of fixed or mobile installation.

In a typical vehicular installation, the D.C. voltages for the electronic equipment are normally supplied from the vehicle's storage battery. This battery is usually intermittently recharged by a generator which functions only when the vehicle is in operation. Because of the intermittent charging of the storage battery, a wide variation in the magnitude of the supply voltages available for the communications equipment often results. The output voltage from a nominally rated 24-volt battery, for example, may vary in a range from 16 to 32 volts. While the battery's varying output voltage would still be satisfactory for other vehicle electrical operations such as lights, starting, etc., a supply of this type with a wide range of voltage output is not altogether suitable for optimum operation of electronic equipment. A similar voltage variation problem exists with storage batteries which are recharged from sources other than a mechanical generator and with batteries which are not designed to be recharged.

To achieve a stabilized D.C. voltage for electronic equipment some type of voltage regulator is often used. In some applications the problem of maintaining the constant D.C. voltage is solved to a degree by providing a power supply having a voltage in excess of the desired stabilized voltage and using a series-type voltage regulator in the supply line to reduce the voltage to and stabilize it at the specified level. While this arrangement is suitable in some cases, it results in a heavy power loss since the excess voltage eliminated is power dissipated for no useful purpose. A similar defect exists with shunt type regulators, such as zener diodes and glow tubes, which are placed in parallel with the load to produce a constant voltage drop to serve as the regulated or stabilized voltage.

The present invention is directed to circuits for the production of stabilized direct current voltages which are produced from a direct current voltage source, such as a battery, having variable range of output voltage. In accordance with the invention the voltage source has its direct current ouptut voltage converted into an alternating current (A.C.) voltage, and then the alternating current voltage is reconverted back into a stabilized direct current voltage. The D.C. to A.C. conversion and the subsequent A.C. to D.C. voltage conversion is under the control of the power demanded by one or more output circuits utilizing the stabilized D.C. output voltage. Control is effected to produce a stabilized D.C. voltage for use by the electronic equipment only when a load is present. Thus, no excess power is wasted as in the case of series and shunt type regulators.

In general, the regulator circuits of the present invention operate as variable direct current power transformers whose power output is controlled by the load. In one embodiment of the invention the final D.C. output voltage is stabilized by controlling the amount of D.C. voltage applied to the D.C. to A.C. converter in accordance with the D.C. power demand present at the output of the regulator circuit. In another embodiment of the invention, the duty cycle of the D.C. to A.C. converter is controlled by the power demand of the output circuit. Therefore, both embodiments supply and regulate the D.C. output voltage in accordance with the demand or load and power is drawn from the source only as the demand dictates. This is the opposite of conventional series and shunt regulators which draw power from the load at all times.

The invention described herein also includes circuit means for establishing a reference level for the final D.C. output voltage and an overload protection arrangement for discontinuing the production of the D.C. output voltage upon sensing of an abnormal load.

It is therefore an object of this invention to provide direct current power supplies for producing stabilized and regulated D.C. output voltages.

Another object of the invention is to provide power supplies operating from variable voltage sources for producing a stabilized direct current output voltage by a direct current to alternating current to direct current voltage conversion.

A further object of the invention is to provide a direct current power supply using a direct to alternating to direct current voltage conversion in which the output voltage of the supply is used to control the direct to alternating current voltage conversion.

Still another object of the invention is to provide a stabilized direct current power supply using a direct to alternating to direct current voltage conversion in which the voltage made available to the direct to alternating current voltage converter is controlled by the power demand at the power supply's output.

Yet a further object of the invention is to provide a regulated direct current power supply using a direct to alternating to direct current voltage conversion in which the duty cycle of the direct to alternating current voltage converter is controlled by the power demand at the power supply's output.

Other objects and advantages of the present invention will become more apparent upon reference to the following specification and annexed drawings in which:

FIGURE 1 is a schematic diagram of one embodiment of voltage regulator circuit made in accordance with the present invention; and FIGURE 2 is a schematic diagram of another embodiment of voltage regulator also constructed in accordance with the principles of the present invention.

The source of direct current voltage for the stabilized supply circuit of FIGURE 1 is a battery 10 whose output voltage may vary from its nominal output rating due to its age, uncharged condition, etc. The output voltage of the battery 10 is filtered through a conventional $\pi$ type filter network formed by a choke 12 and capacitors 13 and 14. The filter network, which may be of any other suitable conventional type, removes any ripple voltage from the battery and/or produced by its charging device (not shown).

The battery 10 is to be used to deliver a regulated and stabilized D.C. voltage to one or more output circuits 16, 18 and 20, having respective pairs of output terminals 17, 19 and 21. The lower one of each of these pairs of output terminals is connected to a suitable source of reference potential such as ground 11, which is also the negative terminal for the battery 10. A switch 15 is provided to turn the circuit on and off.

The D.C. output voltage for each of circuits 16, 18, and 20 is produced by rectifying and filtering the A.C. voltage received from a transverter circuit 23. The transverter 23 is formed by a saturable core transformer 24 and two NPN transistors 26 and 28 and is of conventional construction for free running operation after excitation. Transverter circuit 23 operates to produce a substantially square output A.C. voltage waveform in response to a direct current input voltage from the battery 10. The magnitude of the transverter output voltage waveform, and thus the A.C. voltage available for rectification by the circuits 16, 18 and 20, depends upon the turns ratio of the primary and secondary windings of transformer 24 and the magnitude of the input voltage at junction point 29. The latter, as is described below, is controlled by the demand of the equipment connected to output circuit 16.

The collector of each of the transistors 26 and 28 is connected to the voltage supply point 29 through the respective upper and lower halves of the main primary winding 31 of the transformer 24 whose center tap is connected back to point 29. The capacitor 34 connected across the secondary winding 31 suppresses the spikes produced by the switching of transistors 26 and 28.

The transverter circuit is positively started in the present invention by the first pulse appearing at junction point 29 after the circuit is turned on by switch 15. Production of this pulse is described below. This pulse is applied to the base of both transistors 26 and 28 by capacitor 25 and, due to the inherent imbalance in the circuits of the two transistors, one of them will be driven toward conduction. The conducting transistor will produce a current flow in primary winding 31 of a nature such that a voltage will be induced in its respectively connected feedback control winding 32 or 33 which rapidly drives the conducting transistor further into condition. At the same time a voltage is induced in the other feedback control winding to rapidly drive the other transistor further towards cut-off. This action continues until the current in the collector circuit of the conducting transistor saturates the core of transformer 24 at which time there is no further flux change in the core. This means that no more feedback voltage is induced in control windings 32 and 33. After saturation of the core in one direction by the current of the first conducting transistor, the operation of the circuit switches so that the initially conducting transistor is rapidly driven toward cut-off and the initially cut-off transistor is driven into conduction to saturate the core in the other direction. The circuit then switches back again. This cyclic action continues in a free running manner so that a substantially square wave voltage is induced into transformer secondary windings 36, 38 and 40 from primary winding 31. The square wave is produced because the flux in the transformer core changes at a relatively constant rate as it is driven from negative to positive and positive to negative saturation.

The parameters and connections of the components of the transverter 23 are selected so that it will be free running once it is started. The output voltage in the secondary windings 36, 38 and 40 will be determined by the turns ratio of the transformer primary and secondary windings and the magnitude of the supply voltage available at junction points 29. As will be described below, the voltage at junction point 29 supplied to the transverter 23 is varied in a manner which regulates the voltages available at the secondary windings 36, 38 and 40 in accordance with the load at output circuit 16.

The A.C. square wave output voltage in the primary winding 31 of transformer 24 is inductively coupled to the respective transformer secondary windings 36, 38 and 40 of the output circuits 16, 18, and 20. There may be as many output circuits as are needed to produce the desired output voltages for the associated operating equipment. Each of the output circuits of FIGURE 1 is illustratively of similar construction to produce a positive output voltage and has a full-wave rectifier circuit formed by diodes 42 and 43 whose anodes are connected to the ends of the respective center-tapped secondary windings 36, 38 and 40. The cathodes of each of the diodes 42 and 43 are connected to a low-pass smoothing filter formed by two coil-capacitor sections 44–45 and 46–47. The capacitor 47 is connected across the respective output terminals of each circuit and the output voltage for each circuit is taken off across the capacitor. It should be clear that any type of rectifier circuit may be used, including voltage doublers, triplers, etc., for the various output circuits. The output voltage of each of the circuits 16, 18, and 20 is also dependent upon the turns ratio of the transformer primary winding and the respective secondary winding and this ratio can be selected as desired.

As stated before, the purpose of the circuit of FIGURE 1 is to provide a stabilized D.C. voltage at each pair of output terminals 17, 19, and 21. To do this the output circuits 16, 18, or 20 which is to have the strictest degree of regulation is monitored and the output voltage of this circuit, which varies in accordance with the load across its terminals, is used to control the amount of D.C. voltage available for the transverter at junction 29. By controlling the magnitude of the voltage at junction 29 the output of the transverter circuit 23 is varied in a corresponding manner so that the transverter output voltage increases or decreases with a corresponding increase or decrease of the voltage at the junction 29. In FIGURE 1, output circuit 16 is monitored, but it should be understood that any of the other output circuits can be monitored.

Considering now the control of the voltage for the junction point 29, the positive D.C. voltage from battery 10 at the junction point of the choke 12 and filter capacitor 13 is applied directly to the collector of an NPN power transistor 50. Transistor 50 has its emitter connected to one end of a filter choke 51 whose other end is connected to the junction point 29. The choke 51 is part of a filter circuit formed by a diode 52 connected between the emitter of transistor 50 and ground and a capacitor 53 connected between junction point 29 and ground. The filter circuit formed by components 53, 51 and 52 provides the D.C. voltage at point 29 to power the transverter 23.

The base electrode of transistor 50 is connected directly to the collector of a PNP series-regulator transistor 55. Transistor 55 has its emitter electrode connected back to the output of the battery filter 12, 13, and 14 through a diode 56. Diode 56 is connected to conduct only when forward biased and it also serves as a temperature stabilizing device for transistor 55.

Series-regulator transistor 55 controls the bias at the base of power transistor 50 since it is in series between transistor 50 and the main power supply 10. As the conductivity of transistor 55 increases, its resistance decreases and less voltage is dropped across it. This causes a larger magnitude voltage to be applied to the base of transistor 50. Conversely, decreased conductivity of transistor 55 increases its voltage drop and the voltage at the base of transistor 50 decreases.

The base to emitter bias to control the operation of transistor 55 and thus the conduction of transistor 50 is provided by a voltage divider formed by resistors 58 and 59. The voltage available to divider 58–59 and the base of transistor 55 is controlled by the switching action of a non-symmetrical multivibrator formed by two NPN transistors 64 and 66 and a PNP control transistor 62. The nature of the multivibrator circuit is such that the on-off state of series-regulator transistor 55 is controlled by the action of multivibrator output transistor 66. Transistor 55 in turn controls the conduction of transistor 50 to determine the voltage available at junction 29.

When multivibrator output transistor 66 is non-conducting, it supplies a positive potential, or reverse bias, to the base of transistor 55 through resistor 59 to cut that transistor off. Cutting transistor 55 off decreases the positive voltage at its collector so that the positive voltage at the base of the power transistor 50 is also decreased with the result that transistor 50 is cut off also. Conversely, when transistor 66 is conducting and has minimum voltage at its collector, transistors 55 and 50 also conduct and permit current flow through power transistor 50 to the filter circuit 51, 52, and 53. This alternate turning on and off of transistor 50 by the multivibrator produces a series of pulses at the emitter of transistor 50. The positive pulses produced when transistor 50 is conducting are integrated or filtered by circuit 51, 52 and 53 to produce the positive D.C. voltage at junction 29, which is to be applied to the transverter 23. The magnitude of this positive voltage depends upon the switching cycle of the non-symmetrical multivibrator circuit, i.e., the duration of the positive pulse output of transistor 50. The diode 52 provides a current path for inductor 51 during the time when transistor 50 is cut off.

Briefly describing the multivibrator 64–66, the two transistors 64 and 66 have their emitter electrodes connected to ground through the common resistor 67. The collector of transistor 64 and the base of transistor 66 are connected by a coupling circuit formed by capacitor 68 and resistor 69. Collector bias for transistor 64 is provided by a resistor 70 connected to line 63 which goes to the output of the first filter section 44–45 of output circuit 16. The voltage at this point is stable since it is regulated by the operation of the entire circuit. The collector of transistor 66 receives its bias from the battery 10 through voltage divider 58–59.

The collector of transistor 62 is connected to the base of transistor 64. Base bias is supplied by a resistor 72 connected between the output of filter 12, 13, 14 and the base of transistor 62 and a zener reference diode 74 connected between the base and ground 11. Transistor 62 increases in conductivity when the positive voltage applied to its emitter exceeds the reference voltage set up by the zener diode 74.

Diode 74 sets the reference voltage for the entire circuit so that the voltage of output circuit 16 is regulated to the diode reference voltage. The output voltage of circuit 16 can be the same as the zener diode voltage or can be greater if potentiometer circiut is used to divide the voltage supplied back to the emitter of transistor 62. The output voltages of circuits 18 and 20 can be made different from that of circuit 16 by selecting the turns ratio of the secondary windings 38 and 40 to the primary 31 of transformer 24. However, the output voltages of both circuits 18 and 20 will still be regulated in accordance with the voltage changes appearing across circuit 16.

The transistors 50 and 55 are a controlled amplifier and the transistor 50 drives the alternating current generator comprising the transistors 26 and 28. The transistor 62, the emitter of which is connected to feedback line 63, senses the power demand at the output of the system and functions to control the "on" time of a multivibrator gate which comprises the transistors 64, 66 and 62, transistor 62 being a part of one of the two resistance-capacitance networks in that gate. The operation is such that when additional power demand is sensed, as by a decrease in the positive voltage on line 63, then the "on" time of transistor 66 is increased so that the power supplied through the power amplifiers comprising transistors 55 and 50 is increased. On the other hand, when a decrease in output requirement is sensed by transistor 62 the "on" time of transistor 66 is decreased and the power supplied by the power amplifiers comprising transistors 55 and 50 is decreased.

Transistors 64 and 66 form an emitter-coupled multivibrator and the "on" time of transistor 66 is determined by the magnitude of the effective resistance of the emitter collector circuit of transistor 62. The smaller the resistance, the lesser the "on" time. The circuit elements of the multivibrator circcuit generally correspond to the following elements of those in FIG. 1 of an article entitled "A Transistor Multivibrator," by Rakovich, Electronic Engineering, pages 303–305, Hulton Press, 43–44 Shoe Lane, London, E.C.4, England, May 1961:

| Circuit herein disclosed: | Rakovich |
|---|---|
| 64, Type NPN | $VT_1$, Type PNP |
| 66, Type NPN | $VT_2$, Type PNP |
| 67 | $R_e$ |
| 70 | $R_{c1}$ |
| 59 | $R_{c2}$ |
| Emitter-collector circuit of 62 | $R_{b1}$ |
| 69 | $R_{b2}$ |
| 75 | $C_{b1}$ |
| 68 | $C_{b2}$ |

The "on" time of transistor 66 depends on the time-constant of the discharge circuit of capacitor 75. Said time-constant depends on the resistance of the emitter-collector circuit of transistor 62, through which capacitor 75 discharges. The greater this resistance (i.e., the lesser the conductivity of transistor 62, or the lesser the positive voltage applied to the base of transistor 62), the greater is the "on" time of transistor 66. Conversely, the lesser the resistance (i.e., the greater the positive voltage applied to the emitter of transistor 62), the lesser is the "on" time of transistor 66.

The multivibrator comprising transistors 64 and 66 functions effectively as a gate. When the load at terminals 17 decreases, a higher positive feedback voltage is applied over line 63 to the emitter of transistor 62. This increases the conductivity of that transistor and this action, as has been explained, reduces the "on" time of transistor 66 and therefore decreases the flow of power through the amplifier comprising transistors 55 and 50. Conversely, when the load at terminals 17 increases, a less positive feedback voltage is applied over line 63 to the emitter of transistor 62. This action decreases the conductivity of transistor 62 and increases the "on" time of transistor 66, with resultant increase in the amount of power supplied by the amplifier comprising transistors 55 and 50. The gate comprising transistor 66 and 64 does not function as a gate at all unless a certain minimum positive threshold voltage is applied to the base of NPN-type transistor 66. Tracing the circuitry for applying this base bias voltage to transistor 66, said circuitry comprises resistors 69 and 70, in series, and it originates at the junction of chokes 44 and 46. In the event of an overload, that junction will experience a very substantial decrease in positive voltage, and accordingly the positive voltage bias applied to the base of transistor 66 will be insufficient to render transistor 66 conductive at all. Therefore, for overload conditions power transistor 50 is completely cut off.

From the foregoing it should be clear that power is supplied to the output circuits 16, 18 and 20 only on demand. Therefore no power is wasted and the circuit is very efficient. Further, the entire circuit is automatically protected against overload by permitting the voltage at point 29 to drop substantially to zero.

FIGURE 2 shows another embodiment of the invention whose D.C. output voltage is also produced as a function of the load demand. The same reference numerals are used as in FIGURE 1, where applicable. The circuit of FIGURE 2 illustratively has three output circuits 116, 118 and 120 with respective pairs of output terminals 117, 119 and 121 across which the regulated D.C. output voltage appears. The lower one of each pair of terminals is connected to the point of reference potential 11.

Output circuit 116 has a full wave bridge type rectifier formed by four diodes 122 connected across the secondary winding 36 of transverter transformer 24. The diodes 122 are poled to produce a positive output voltage across capacitor 47 of circuit 116 and on a voltage sensing feedback line 124 connected to the junction of chokes 44 and 46 and capacitor 45. Output circuit 116 is selected to be the one with the strictest degree of regulation. Circuit 116 is illustratively designed to have a higher positive voltage output than circuit 118, which only has the full wave rectifier circuit formed by diodes 42 and 43. This lower positive voltage from circuit 118 is also applied to a voltage supply line 125 connected to the junction of chokes 44 and 46 and capacitor 45 of circuit 118. The diodes 42 and 43 of circuit 120 are illustratively poled to produce a negative output voltage across terminals 121 although any type of voltage output may be obtained by suitable choice of the rectifier circuits.

The circuit of FIGURE 2 also has a transverter circuit 123 formed by two NPN transistors 126 and 128 and the primary winding 31 and feedback control windings 32 and 33 of saturable core transformer 24. The transverter 123 is similar in some respects to transverter 23 of FIGURE 1. However, rather than being free-running like transverter 23, transverter 123 has to be triggered into operation. The triggering is effected in a manner to vary the duty cycle of transverter 123 and thus control the output voltage of the circuits 116, 118 and 120.

The voltage from battery 10 is supplied to the collector electrodes of two transistors 126 and 128 through the center tap of primary winding 31. Resistors 127 and 129 are connected to the base electrodes of the respective transistors 126 and 128 and the emitters of both transistors are connected to ground. Transistor 126 also has a silicon controlled rectifier 131 connected between one end of resistor 127 and the feedback control winding 32. The gating electrode of control rectifier 131 is returned to ground through resistors 138 and 139, the latter resistor also returning the base of transistor 126 to ground.

The lower half of the transverter circuit formed by the transistor 128 and feedback control winding 33 is fully regenerative and operates in a manner similar to the lower half of transverter circuit 23. However, the upper half of transverter 123, which includes transistor 126, feedback control winding 32 and the silicon controlled rectifier 131, is not regenerative. The only time this upper half of the transverter is regenerative is when the silicon controlled rectifier 131 is fired. This reduces the resistance of the rectifier sufficiently to permit the feedback voltage in winding 32 to be applied to the base electrode of transistor 126. When this condition exists, the entire transverter 123 operates in a regenerative manner to produce a cycle of positive and negative output pulses in the primary winding 31 for inductive coupling to the secondary windings 36, 38 and 40 of the output circuits.

As is described below, the firing of the silicon rectifier 131 is controlled by a load sensing circuit connected to output circuit 116. The load sensing circuit operates to decrease the frequency of operation of the transverter when the load on circuit 116 decreases and to increase the frequency of the transverter when the load increases. This makes transverter 123 have a variable duty cycle. An increase in the duty cycle of the transverter produces an increased D.C. output voltage for circuits 116, 118 and 120 while a decrease in the duty cycle decreases the output voltage. It should be understood that the final D.C. output voltage is a rectified version of the A.C. voltage produced by the transverter 123 and that the D.C. voltage will therefore vary proportionately with the duty cycle.

Considering now the operation of the circuit of FIGURE 2, with switch 15 on and with no load on output circuit 116, control rectifier 131 is cut off. This prevents the upper half of the transverter circuit from being regenerative. The voltage from battery 10 is applied to the collector of an NPN transistor 135 whose collector is connected to the center tap of primary winding 31. The conduction level of transistor 135 is fixed by a zener diode 137 connected between the transistor base and ground 11. Operating voltage for zener diode 137 is supplied by a resistor 136 connected between the base and collector of transistor 135. The emitter of transistor 135 is returned to ground through a series connected transistor 145 and emitter resistor 146.

The upper half of transverter 123 is made regenerative by firing a unijunction transistor 140 whose output pulse is applied to the base of transistor 145 through a capacitor 143. The transistor 145 output is taken across resistor 146 and applied through signal diode 150 to the gating electrode of the controlled rectifier 131. When unijunction transistor 140 fires, the resistance of controlled rectifier 131 is lowered. This permits feedback from the control winding 32 to the base of transistor 126 and makes transverter 123 regenerative during the application of the firing pulse and for the balance of the regenerative cycle.

The transistor 155 senses a change in output load power demand. Whenever a load exists in the output such that a half cycle of the multivibrator, comprising transistors 126 and 128, can register a voltage across it, that voltage is sensed at the base of transistor 155 and is amplified by the transistors 160 and 140. The output of transistor 140 activates transistor 145 to drive rectifier 131.

After normal operating conditions are reached, the firing rate of unijunction transistor 140, and hence the duty cycle of transverter 123, is controlled by a differential amplifier circuit formed by transistors 155 (NPN), 160 (PNP) and 165 (NPN). Transistors 160 is used as a variable resistance forming part of a time constant circuit including resistor 141 and capacitor 142 for the emitter of unijunction transistor 140. As the conductivity of transistor 160 increases, meaning that its resistance decreases, the firing frequency of the unijunction transistor will increase. This increases the transverter 123 duty cycle and raises the output voltage of circuits 116, 118 and 120. Conversely, as the conductivity of transistor 160 decreases, meaning that its resistance increases, the firing frequency of transistor 140 decreases. this decreases the transverter duty cycle and decreases the output voltage.

Resistor 157 is variable and its center arm is connected to the base of transistor 155. The collector voltage for transistor 155 is supplied by a voltage divider, formed by resistors 161 and 162, which is connected to diode 159 in the voltage supply line 125. The emitter of transistor 160 is biased by resistor 162 while the emitters of both transistors 155 and 165 are returned to ground 11 through a common resistor 163.

As the demand of the load registers across circuit 116, the base of transistor 155 is supplied with a forward bias. Transistor 155 starts to conduct and begins to supply a voltage to the emitter of transistor 160 through resistor 161. This voltage is applied through resistor 141 to the emitter of unijunction transistor 140 causing it to fire. Firing of unijunction transistor 140 produces a positive output pulse which is conveyed through capacitor 143 to the base of transistor 145. A positive output pulse is taken off the emitter of transistor 145 across resistor 146 and conveyed through diode 150 to the gating electrode of the controlled rectifier 131. This reduces the resistance of rectifier 131 and permits the upper half of the transverter 123 to become regenerative.

As transverter 123 becomes fully regenerative, a greater amplitude voltage is produced in output circuits 116 and 118.

This build-up action continues until the duty cycle of transverter 123 is sufficient to produce the rated operating voltage at output circuits 116 and 118 and on lines 124 and 125. Appearance of the positive rated operating voltage on line 125 cuts off transistor 135, since the emitter of this NPN transistor is connected directly to line 125. Transistor 135 remains cut off during normal operation of the circuit and has no further effect until the voltage on line 125 drops below the value set by zener diode 137. The rated operating voltage on line 125 also biases the emitter of the unijunction transistor 140 through resistor 175, the number 2 base of the unijunction transistor through resistor 176, and the base of transistor 145 through resistor 177. The number 1 base of the unijunction transistor 140 is returned to ground through a resistor 178.

The basic reference voltage level for production of the normal rated operating voltages by the circuit is set by the transistor 165 which has a zener diode 166 and capacitor 167 connected between the base of the transistor and ground. As the output of the fully regenerative operating transverter 123 starts to be produced across circuit 118, the voltage on line 125 is applied to the base and collector of transistor 165 through respective resistors 168 and 171. The voltage on the base of transistor 165 rises gradually in accordance with the charging rate of capacitor 167.

Any variation in the load of the regulated circuit 116 is conveyed as a voltage change to the base of transistor 155 to change its conductivity. This in turn changes the conductivity of transistor 160 and controls the firing frequency of the unijunction transistor 140. For example, consider that the load at circuit 116 increases so that the voltage on line 124 drops. This voltage drop appears across voltage divider 156, 157 and 158 at the base of transistor 155 and causes a decrease in its conductivity with a resultant rise of its collector output voltage. This rising voltage is applied to the emitter of transistor 160. If the rising voltage on the emitter spreads the base bias of transistor 160, its conductivity will increase. This reduces the resistance of the transistor 160 with a consequent increase in the firing frequency of the unijunction transistor 140 and an increase in the duty cycle of the transverter 123. This will act to reestablish the normal rated voltage at circuit 116 to its rated output as basically set by zener diode 166.

In the opposite situation, where the load on circuit 116 decreases, a voltage rise on line 124 increases the conductivity of transistor 155 causing its collector voltage to drop. This decreases the conductivity of transistor 160, increasing the time constant for the unijunction transistor 140 and lowering its firing frequency. This in turn reduces the duty cycle of transverter 123 and drops the voltage at the output of circuit 116.

Overload protection for the circuit is obtained as follows. When there is an overload on circuit 116 the voltage at the base of transistor 155 drops close to zero causing a high positive voltage at its collector electrode. This high positive voltage saturates transistor 160 and causes it to have an extremely low resistance. The total resistance of transistor 160 and resistance 141 is now too small to permit firing of the unijunction transistor 140. This keeps controlled rectifier 131 switched off, causing the upper half of transverter circuit 123 to become non-regenerative.

Diode 166 provides a voltage reference for the entire system. Capacitor 167 not only suppresses noise generated in diode 166, but also delays the build-up of reference voltage when the system is first energized by closing the battery switch 15.

Transistor 135 supplies the operating voltage to the control circuitry including elements numbered 160, 165, 155, 140, 145, and 131 until the system is supplied through diode 159.

While certain conductivity types (NPN or PNP) have been ascribed to different ones of the transistors, it should be understood that the opposite conductivity types can be used by suitable selection of the biasing voltages for the transistors.

The voltage regulator circuits of the present invention are highly efficient since they operate in accordance with the demand of the load. Due to this, there is relatively little power lost during standby or normal operation of the circuits. Further, both of the circuits described provide automatic overload protection to prevent any of the circuit components from becoming damaged. This is also an extremely desirable result.

While preferred embodiments of this invention have been described above, it will be understood that these are illustrative only, and the invention is limited solely by the appended claims.

What is claimed is:

1. A voltage regulator circuit operating from a primary source of direct current voltage for producing a regulated direct current output voltage for application to a load comprising:

a fully regenerative free-running transverter means for converting said direct current voltage into an alternating current voltage, output means electrically coupled to said transverter means for producing a regulated direct current output voltage of a predetermined amplitude from said alternating current voltage for application to the load, means connected to said output means for sensing the load thereon and producing a signal of an amplitude corresponding to said load, means for producing a reference signal of an amplitude representative of the predetermined amplitude of said regulated direct current voltage, means for comparing the signal from said load-sensing means and said reference signal and for producing an output signal corresponding to the deviation of the regulated direct current output voltage from said predetermined amplitude, controllably operated means connected between said source of direct current voltage and said transverter means for producing a pulse type output voltage in accordance with the conducting time of said means, filter means connected to said controllably operated means and said transverter means for converting the pulse type output voltage into a direct current voltage for application to said transverter, an asymmetrical multivibrator circuit connected to said controllably operated means and said comparing means and responsive to the output signal of said comparing means for producing a control signal of varying period to change the conducting time of the controllably operated means in a manner to restore the regulated direct current output voltage to said predetermined amplitude, and means connected to said load-sensing means and to said controllably operated means for preventing the production of said pulse type output voltage in response to sensing an overload condition in the output means.

2. The combination of:

a source of direct current, a relaxation oscillator connected to said source to be energized thereby and including a comparator device having two inputs, said comparator device functioning as a gate to control the duration of the pulse output of said relaxation oscillator, processing means for amplifying and filtering said pulses, a transverter for converting the energy output of the processing means into alternating currents, a rectifier-filter network having an output adapted to be coupled to a load, the aforesaid source and oscillator and processing means and network being cascaded in the order named, a sampling connection between said rectifier-filter network and one input of said comparator device for sampling the voltage applied to said load, and means for applying a stabilized reference potential to the other input of said comparator device, the duration of the gating function performed by said comparator device being dependent on the comparison between said sampled voltage output and said reference potential, said sampling connection and said one input constituting an entire feedback path.

3. The combination in accordance with claim 2 wherein the comparator device is a transistor having an emitter and a collector and a base, the emitter constituting the first input and the base constituting the second input.

4. The combination in accordance with claim 3 in which the relaxation oscillator is a multivibrator of the emitter-coupled type comprising two transistors of which one is an output transistor, and a connection between the output one of said transistors and said sampling connection to shut off said one transistor in the event of an undesired decrease in the sampled voltage.

References Cited by the Examiner
UNITED STATES PATENTS

| | | | |
|---|---|---|---|
| 2,776,382 | 1/1957 | Jensen. | |
| 2,848,614 | 8/1958 | Lyons | 321—2 X |
| 2,950,446 | 8/1960 | Humez et al. | 321—2 X |
| 3,004,206 | 10/1961 | Sheffet | 321—18 X |
| 3,192,464 | 6/1965 | Johnson et al. | 321—2 |

FOREIGN PATENTS 826,783  1/1960  Great Britain.

JOHN F. COUCH, *Primary Examiner.*

W. H. BEHA, *Assistant Examiner.*